United States Patent
Bandou et al.

(10) Patent No.: US 8,538,172 B2
(45) Date of Patent: Sep. 17, 2013

(54) IMAGE RECOGNITION APPARATUS WITH A PLURALITY OF CLASSIFIERS

(75) Inventors: Takashi Bandou, Nagoya (JP); Naoki Fukaya, Oobu (JP)

(73) Assignee: Denso Corporation, Kariya (JP)

( * ) Notice: Subject to any disclaimer, the term of this patent is extended or adjusted under 35 U.S.C. 154(b) by 406 days.

(21) Appl. No.: 12/804,715

(22) Filed: Jul. 28, 2010

(65) Prior Publication Data

US 2011/0026829 A1    Feb. 3, 2011

(30) Foreign Application Priority Data

Jul. 29, 2009  (JP) ................................. 2009-176474

(51) Int. Cl.
*G06K 9/62*    (2006.01)
(52) U.S. Cl.
USPC ........... 382/224; 382/190; 382/118; 382/100; 382/159
(58) Field of Classification Search
USPC .................. 382/190, 226, 100, 118, 159, 224
See application file for complete search history.

(56) References Cited

U.S. PATENT DOCUMENTS

| 7,099,510 B2 | 8/2006 | Jones et al. | |
| 2008/0247598 A1 * | 10/2008 | Movellan et al. | ............. 382/100 |

* cited by examiner

*Primary Examiner* — Matthew Bella
*Assistant Examiner* — Ruiping Li
(74) *Attorney, Agent, or Firm* — Harness, Dickey & Pierce, PLC

(57) ABSTRACT

In an apparatus, an applying unit applies selected classifiers in sequence to an object image. A score calculating unit calculates, each time a classifier is applied to the object image, a summation of an output of an at least one classifier already applied to the object image to thereby obtain an acquisition score as the summation. The output of the at least one already applied classifier is weighed by a corresponding weight. A distribution calculating unit calculates, each time a classifier is applied to the object image, a predicted distribution of the acquisition score that would be obtained if at least one unapplied classifier in the classifiers, which has not yet been applied to the object image, were applied to the object image. A judging unit judges, based on the predicted distribution, whether to terminate an application of the at least one unapplied classifier to the object image.

4 Claims, 8 Drawing Sheets

|  | DETECTION ERROR RATE | | AVERAGE NUMBER OF APPLIED WEAK CLASSIFIERS |
|---|---|---|---|
|  | FALSE POSITIVE RATE | MISS RATE |  |
| NormalBoost | 0.011 | 0.351 | 1000 |
| Viola-Jones | 0.006 | 0.636 | 283.108 |
| ClassProb | 0.014 | 0.314 | 258.454 |
| AS Boost | 0.075 | 0.099 | 155.392 |

IMAGE RECOGNITION APPARATUS WITH A PLURALITY OF CLASSIFIERS

CROSS REFERENCE TO RELATED APPLICATIONS

This application is based on Japanese Patent Application 2009-176474 filed on Jul. 29, 2009. This application claims the benefit of priority from the Japanese Patent Application, so that the descriptions of which are all incorporated herein by reference.

FIELD OF THE INVENTION

The present invention relates to image recognition apparatuses with a plurality of classifiers.

BACKGROUND OF THE INVENTION

There are known driver assistance systems that monitor the driver's eyes using images picked up by an in-vehicle camera to thereby detect the driver's inattentive driving and oversight, and alert the driver of them. Specifically, these driver assistance systems are designed to extract face images each containing a facial region (facial pattern) from sequentially inputted images captured by an in-vehicle camera; the facial region contains predetermined facial features, such as right and left eyes, nose, and mouth of the driver. These driver assistance systems are also designed to detect the location of the face within the face image. In order to meet requirements for vehicle safety improvement request, it is important for these driver assistance systems to immediately detect the position of the face within the face image with high accuracy.

Boosting, which trains a plurality of weak classifiers, is well known as a machine-learning algorithm. Using the combination of the boosted weak classifiers to recognize a target image, such as a face image, in a plurality of images ensures the accuracy and robustness of target-image recognition.

Let us describe the boosting algorithm assuming that: an input image (expressed as an array of pixels) is given as x, the output of an n-th trained weak classifier in a plurality of weak classifiers is given as $f_n(x)$, the weight or importance given to the n-th trained weak classifier is given as $w_n$, the number of the plurality of weak classifiers is given as Nf.

In the boosting algorithm, a score $S_{1:Nf}(x)$ as the summation of the outputs $f_n(x)$ (n=1, 2, ..., Nf) of the trained weak classifiers respectively weighted by the weights $w_n$ (n=1, 2, ..., Nf) is expressed as the following equation [1]:

$$S_{1:Nf}(x) = \sum_{n=1}^{Nf} w_n f_n \quad [1]$$

where the weights $w_n$ are normalized to meet the following equation [2]:

$$\sum_{n=1}^{Nf} w_n = 1 \quad [2]$$

Then, the output $F_{1:Nf}(x)$ of the combination of the trained weak classifiers is determined based on the score $S_{1:Nf}(x)$ in accordance with the following equation [3]:

$$F_{1:Nf}(x) = \begin{cases} 1 : S_{1:Nf}(x) \geq 0.5 \\ 0 : S_{1:Nf}(x) < 0.5 \end{cases} \quad [3]$$

Specifically, when the score $S_{1:Nf}(x)$ of the outputs $f_n(x)$ (n=1, 2, ..., Nf) of the trained weak classifiers respectively weighted by the weights $w_n$ (n=1, 2, ..., Nf) is equal to or greater than a threshold value of 0.5, the final output of the combination of the trained weak classifiers is a value "1" of TRUE; this value "1" indicates that the input image x is likely to a face image. That is, the boosting algorithm identifies that the input image x is a target image that is likely to contain a facial region.

Otherwise, when the score $S_{1:Nf}(x)$ of the outputs $f_n(x)$ (n=1, 2, ..., Nf) of the trained weak classifiers respectively weighted by the weights $w_n$ (n=1, 2, ..., Nf) is less than the threshold value of 0.5, the final output of the combination of the trained weak classifiers is a value "0" of FALSE, this value "0" indicates that the input image x is not likely to a face image. That is, the boosting algorithm identifies that the input image x is not an object image that is likely to contain a facial region.

As described above, the boosting process requires a large number of weak classifiers so as to improve the accuracy and/or robustness of object-image recognition. However, the more the number of weak classifiers to be used increases, the more time taken to identify whether the input image is an object image increases. In other words, there is a trade-off between the robustness of the object-image recognition and the speed thereof.

U.S. Pat. No. 7,099,510 discloses an algorithm, referred to as Viola and Jones algorithm, designed based on the boosting algorithm; this Patent Publication will be referred to as reference 1.

Specifically, Viola and Jones algorithm uses a cascade of a plurality of classifiers based on the boosting algorithm. The Viola and Jones algorithm applies the series of classifiers to every input image in the order from the initial stage to the last stage. Each of the classifiers calculates, for each input image, the score as the summation of the outputs of applied classifiers. Each of the classifiers discards some of the input images whose scores are less than a threshold value predetermined based on the number of applied stage(s) to thereby early eliminate them as negative images to which no subsequent stages are applied. This algorithm can speed up object-image recognition.

SUMMARY OF THE INVENTION

The inventors have discovered that there is a problem in the conventional image-recognition algorithm using the cascade of classifiers.

Specifically, the conventional image-recognition algorithm cannot use classifiers downstream of the classifier that carries out early elimination. This is opposite to the purpose of the boosting, which achieves object-image recognition with high accuracy by means of many weak classifiers. Thus, the conventional image-recognition algorithm may reduce the inherent robustness of the boosting, making it difficult to reduce the trade-off between the object-image recognition and the speed thereof.

In view of the circumstances set forth above, the present invention seeks to provide image recognition apparatuses and methods designed to solve the problem set forth above.

Specifically, the present invention aims at providing image recognition apparatuses and methods capable of carrying out early elimination of negative images without reducing the robustness thereof.

According to one aspect of the present invention, there is provided an image recognition apparatus. The image recognition apparatus includes a classifying unit comprising a plurality of classifiers. The plurality of classifiers are configured to be sensitive to images respectively having different specific patterns. The image recognition apparatus includes an applying unit configured to successively select the classifiers, and apply the selected classifiers in sequence to an input image as an object image. The image recognition apparatus includes a score calculating unit configured to calculate, each time one of the classifiers is applied to the object image by the applying unit, a summation of an output of at least one classifier already applied to the object image by the applying unit to thereby obtain an acquisition score as the summation, the output of the at least one already applied classifier being weighed by a corresponding weight The image recognition apparatus includes a distribution calculating unit configured to calculate, each time one of the classifiers is applied to the object image by the applying unit, a predicted distribution of the acquisition score that would be obtained if at least one unapplied classifier in the classifiers, which has not yet been applied to the object image, were applied to the object image. The image recognition apparatus includes a judging unit configured to judge, based on the predicted distribution calculated by the distribution calculating unit, whether to terminate an application of the at least one unapplied classifier to the object image by the applying unit.

According to a first alternative aspect of the present invention, there is provided an image recognition method. The method includes providing a plurality of classifiers, the plurality of classifiers being configured to be sensitive to images respectively having different specific patterns, successively selecting the classifiers, and applying the selected classifiers in sequence to an input image as an object image. The method includes calculating, each time one of the classifiers is applied to the object image by the applying unit, a summation of an output of at least one classifier already applied to the object image by the applying to thereby obtain an acquisition score as the summation, the output of the at least one already applied classifier being weighed by a corresponding weight. The method includes calculating, each time one of the classifiers is applied to the object image by the applying, a predicted distribution of the acquisition score that would be obtained if at least one unapplied classifier in the classifiers, which has not yet been applied to the object image, were applied to the object image, and judging, based on the predicted distribution, whether to terminate an application of the at least one unapplied classifier to the object image by the applying.

According to a second alternative aspect of the present invention, there is provided a computer program product. The computer program product includes a computer usable medium, and a set of computer program instructions embodied on the computer useable medium, including instructions to: successively select a plurality of classifiers, the plurality of classifiers being configured to be sensitive to images respectively having different specific patterns, apply the selected classifiers in sequence to an input image as an object image, calculate, each time one of the classifiers is applied to the object image by the applying unit, a summation of an output of at least one classifier already applied to the object image by the applying instruction to thereby obtain an acquisition score as the summation, the output of the at least one already applied classifier being weighed by a corresponding weight, calculate, each time one of the classifiers is applied to the object image by the applying, a predicted distribution of the acquisition score that would be obtained if at least one unapplied classifier in the classifiers, which has not yet been applied to the object image, were applied to the object image, and judge, based on the predicted distribution, whether to terminate an application of the at least one unapplied classifier to the object image by the applying instruction.

In these aspects of the present invention, a plurality of classifiers configured to be sensitive to images respectively having different specific patterns are successively selected to be applied in sequence to an input image as an object image.

Each time one of the classifiers is applied to the object image, a summation of an output of at least one classifier already applied to the object image is calculated so that an acquisition score is obtained as the summation; the output of the at least one already applied classifier is weighed by a corresponding weight. In addition, each time one of the classifiers is applied to the object image, a predicted distribution of the acquisition score that would be obtained if at least one unapplied classifier in the classifiers, which has not yet been applied to the object image, were applied to the object image, is calculated.

Based on the predicted distribution, whether to terminate an application of the at least one unapplied classifier to the object image is judged.

Note that a classifier configured to be sensitive to an image having a specific pattern means that the classifier has a positive judgment for the object image.

With the configuration of each aspect of the present invention, whether to terminate the application of the at least one unapplied classifier to the object image is judged based on: not only the acquisition score based on the classified result of the already applied classifier but also the predicted distribution of the at least one unapplied classifier that would be obtained if the at least one unapplied classifier, which has not yet been applied to the object image, were applied to the object image.

Thus, it is possible to necessarily use the information of the unapplied classifiers to thereby determine whether to terminate the application of the at least one unapplied classifier to the object image. This reduces time taken to recognize the object image without reducing the robustness of the recognition.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Figure 1:
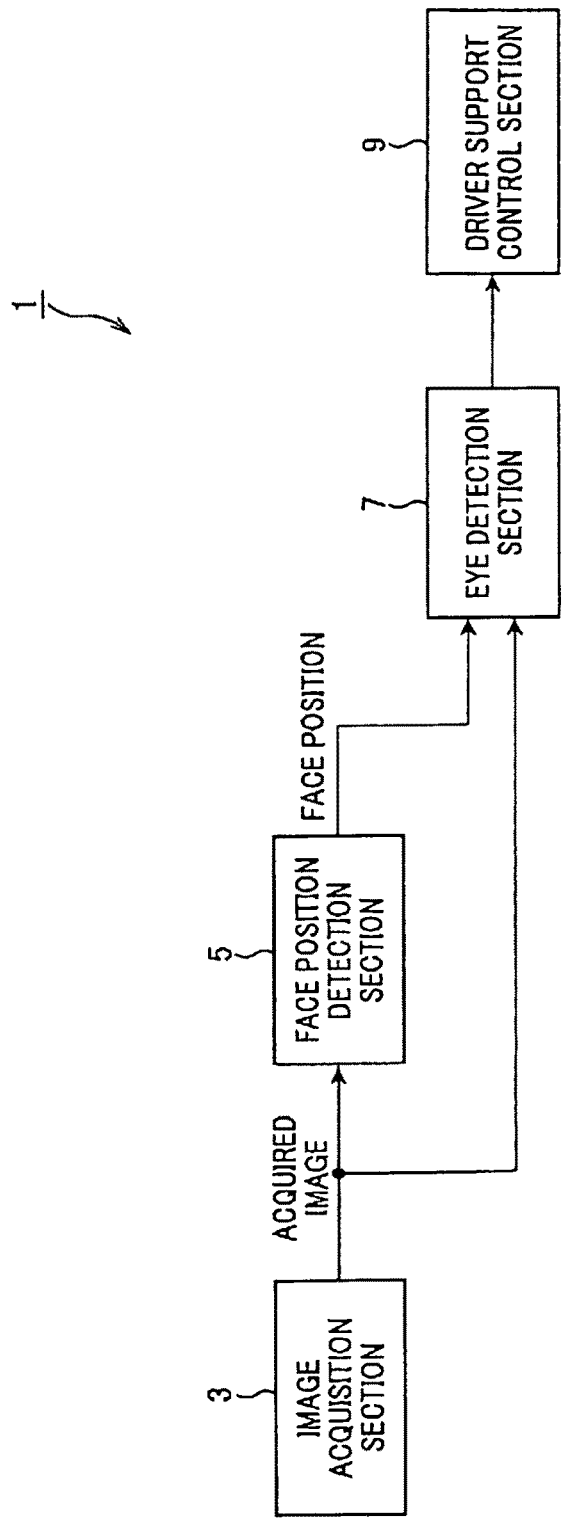
FIG. 1 is a block diagram schematically illustrating an example of the overall structure of a driver assistance system to which an image recognition apparatus according to the first embodiment of the present invention is applied.

Embodiments of the present invention will be described hereinafter with reference to the accompanying drawings. In the drawings, identical reference characters are utilized to identify identical corresponding components.

First Embodiment

Referring to FIG. 1, there is provided a vehicle-installed driver assistance system 1 to which an image recognition apparatus according to the first embodiment of the present invention is applied.

The driver assistance system 1 includes an image acquisition section 3, a phase position detection section 5, an eye detection section 7, and a driver support control section 9.

The image acquisition section 3 is operative to acquire images of a region that includes the face of the driver, and supply these images to the face position detection section 5; each of the acquired images is expressed as an array of pixels consisting of digitized light-intensity values). The face position detection section 5 is operative to detect the position of the vehicle driver's face within each of the acquired images supplied from the image acquisition section 3.

The eye detection section 7 is operative to detect the driver's eyes, based on an acquired image supplied from the image acquisition section 3 and face position information that is supplied from the face position detection section 5; this face position information represents the detected position of the vehicle driver's face within each acquired image.

The driver support control apparatus 9 is operative to judge whether the driver's eyes appear in a normal or abnormal condition, for example, are off the road based on the results of detection supplied from the face position detection section 5. The driver support control apparatus 9 is also operative to generate a warning signal when an abnormal condition is detected.

For example, the image acquisition section 3 of this embodiment is made up of a CCD (charge-coupled device) type of digital video camera, which acquires successive images containing the head of the vehicle, and an LED lamp which illuminates the face of the driver. The illumination light used by the LED lamp is in the near infra-red range, to enable images to be acquired even during night-time operation. The image acquisition section 3 is, for example, mounted on the vehicle dashboard, but can be located in the instrumental panel, the steering column, the rear-view mirror, or the like. Although an LED lamp is used with this embodiment, it would be equally possible to utilize other types of lamp, or to omit the lamp.

The eye detection section 7 and driver support control section 9 perform known forms of processing, which are not directly related to the principles of the present invention, so that description of these is omitted.

Face Position Detection Section

Figure 2:
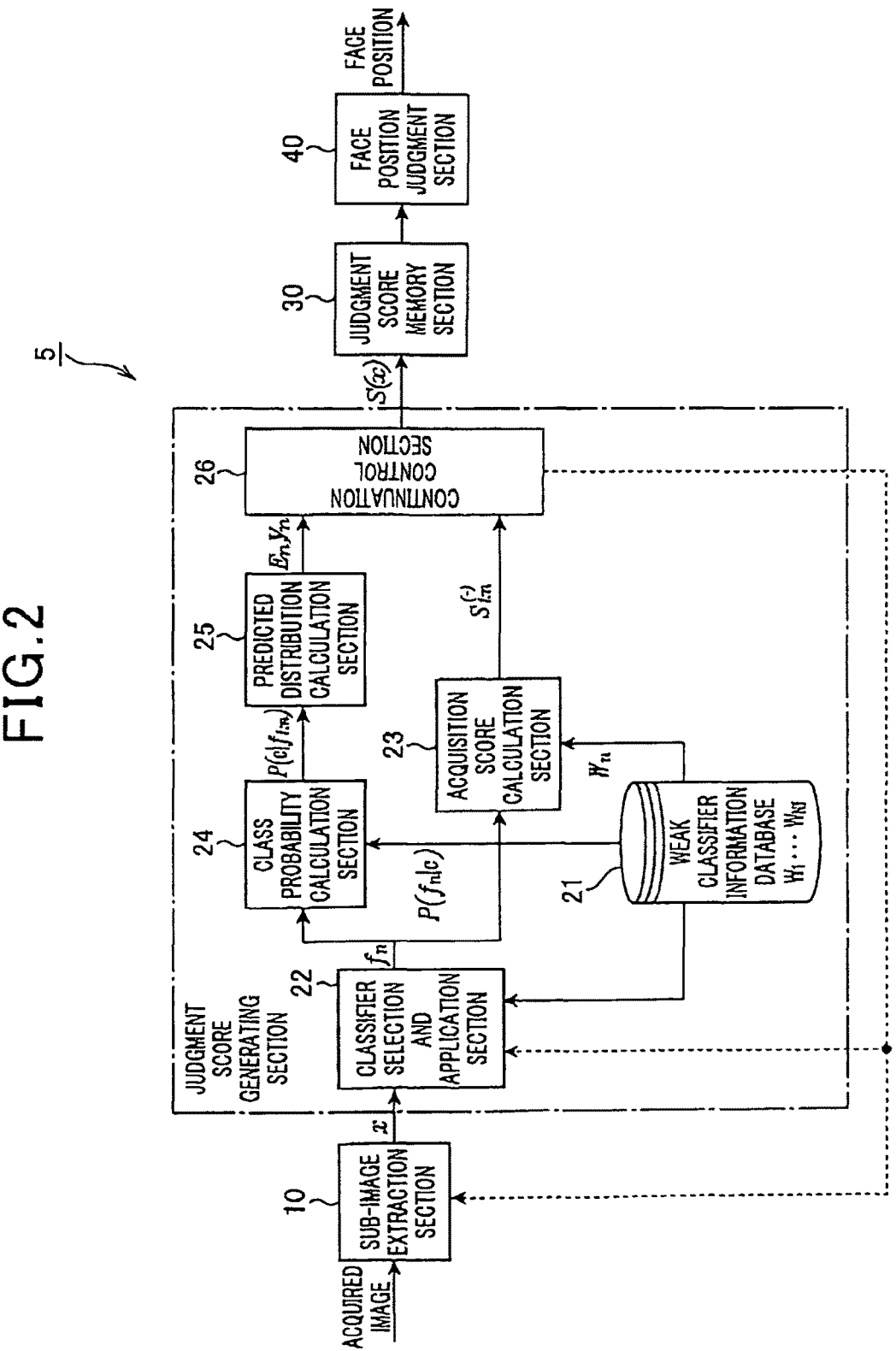
FIG. 2 is a detailed block diagram of a face position detection section illustrated in FIG. 1.

FIG. 2 is a detailed block diagram of the face position detection section 5; this face position detection section 5 corresponds to an image recognition apparatus according to this embodiment of the present invention. The term "face position" as used herein refers to the position of a limited-size rectangular region (facial region) within an acquired image supplied from the image acquisition section 3; this limited-size rectangular facial region contains the eyes, nose, and mouth of a face, with that facial region preferably being of the smallest size which can accommodate these features. Such a facial region is illustrated by reference character A in FIG. 6, and will be also referred to as "face image" hereinafter.

Note that images are divided into two classes; one of the classes to which the face images belong will be referred to as "face class", and the other thereof to which non-face images except for the face images belong will be referred to as "non-face class".

Referring to FIG. 2, the face position detection apparatus 5 includes a sub-image extraction section 10, a judgment score generating section 20, a judgment score memory section 30, and a face position judgment section 40.

The sub-image extraction section 10 is operative to apply a scanning window to extract successive sub-images of predetermined size from an acquired image supplied from the image acquisition section 3; these sub-images are object images for recognition in an acquired image. For each sub-image (also referred to as object image), the judgment score generating section 20 is operative to calculate a corresponding judgment score for judging which class the sub-image is divided into. The judgment score memory section 30 is operative to store each judgment score obtained by the judgment score generating section 20 in conjunction with information identifying the corresponding sub-image. The face position judgment section 40 is operative to detect, based on the information stored in the judgment score memory section 30, the position of the sub-image having the highest judgment score, and output the detected position of the sub-image as the face position within the acquired image.

Note that, when a plurality of faces can be contained in an acquired image, the face position judgment section 40 can be operative to detect, based on the information stored in the judgment score memory section 30, the positions of the sub-images each having a judgment score higher than a reference value of, for example, 0.5, and output the detected positions of the sub-images as the face positions within the acquired image.

For simplicity of description, functions executable by the face position detection apparatus 5 are described in the form of the above system sections. However, these functions can be implemented by programmed operation of a computer (programmed logic circuit) or a combination of computer-implemented functions and dedicated circuitry. A memory function of a weak classifier information database 21 (described hereinafter) can be implemented by one or more non-volatile data storage devices, such as ROMs, hard disks, etc.

Sub-Image Extraction Section

The sub-image extraction section 10 is operative to extract successive sub-images (object images) from an acquired image supplied from the image acquisition section 3 by using a scanning window which traverses from left to right (main scanning direction) and top to bottom (secondary scanning direction) of the acquired image, covering the entire acquired image. The sub-images can be extracted such as to subdivide the acquired image, or such as to successively partially overlap.

The scanning of an entire acquired image is performed using (in succession) each of a plurality of different prescribed sizes of sub-image (i.e., different sizes of scanning window). With this embodiment, the prescribed sizes (determined by the sub-image extraction section 10) are 80×80 pixels, 100×100 pixels, 120×120 pixels, 140×140 pixels, 160×160 pixels, and 180×180 pixels.

Judgment Score Generating Section

The judgment score generating section 20 includes a weak classifier information database 21 having information stored therein beforehand expressing a plurality of weak classifiers (WC in FIG. 2) designed to be sensitive to images respectively having a plurality of different specific patterns.

For example, each weak classifier is an evaluation function, and designed to classify object images into the face class and the non-face class based on at least one of Haar-like features. For example, each of the Haar-like features is defined as the difference of the sum of pixels of areas inside a corresponding rectangular region.

The plurality of weak features are established beforehand in a learning phase, with corresponding weights being thereby assigned, using a boosting algorithm in conjunction with a plurality of training images (respective instances of object image included in the face class, such as positive images, and a plurality of object images included in the non-face class, such as negative images). Such boosting techniques for training a plurality of weak classifiers, e.g., using the AdaBoost algorithm as described in reference 1, are well documented, so that detailed description is omitted.

As a result, the plurality of trained classifiers is designed to classify object images into the face class and the non-face class based on the corresponding features. Specifically, assuming that: an object image is given as x, the number of the plurality of weak classifiers is given as Nf, the index value of a weak classifier in the plurality of weak classifiers is given as n (n=1, 2, ..., Nf), and the output of a weak classifier in the plurality of weak classifiers is given as $f_n(x)$, the output $f_n(x)$ of a weak classifier is equal to 1 when the object image belongs to the face class, and the output $f_n(x)$ of a weak classifier is equal to 0 when the object image belongs to the non-face class.

Note that, in this embodiment, the Haar-like features are used for each weak classifier to carry out classifications of object images, but any feature, which can be applied for weak classifiers, can be used therefor. The output $f_n(x)$ of a weak classifier will be abbreviated as $f_n$.

Each of the plurality of weak classifiers includes a judgment probability of the corresponding weak classifier correctly outputting 1 when an object image (a face image) that should be classified into the face class is inputted thereto; this judgment probability will be referred to as a positive judgment possibility for the face class. Each of the plurality of weak classifiers includes a judgment probability of the corresponding weak classifier incorrectly outputting 1 when an object image (a non-face image) that should be classified into the non-face class is inputted thereto; this probability will be referred to as a negative judgment possibility for the non-face class.

In addition, each of the plurality of weak classifiers includes a judgment probability of the corresponding weak classifier correctly outputting 0 when an object image (a non-face image) that should be classified into the non-face class is inputted thereto; this judgment probability will be referred to as a positive judgment possibility for the non-face class. Each of the plurality of weak classifiers includes a judgment probability of the corresponding weak classifier incorrectly outputting 0 when an object image (a face image) that should be classified into the face class is inputted thereto; this judgment probability will be referred to as a negative judgment possibility for the face class. The information of these judgment probabilities for each weak classifier has been set in the learning phase and stored beforehand in the weak classifier database 21.

Specifically, in this embodiment, a set of the classes is given as C, and elements of each of the face class and non-face class are expressed as c so that each element c of the face class is 1, and each element c of the non-face class is 0. Using the parameters c allows the judgment probabilities of each weak classifier $f_n$ for each element c to be expressed as "$p(f_n/c)$".

The judgment probabilities $p(f_n/c)$ of each weak classifier $f_n$ for each element c are described in a judgment probability table in association with the index value of a corresponding one of the weak classifiers $f_n$, and the judgment probability table is stored beforehand in the weak classifier information database 21.

Figure 3:
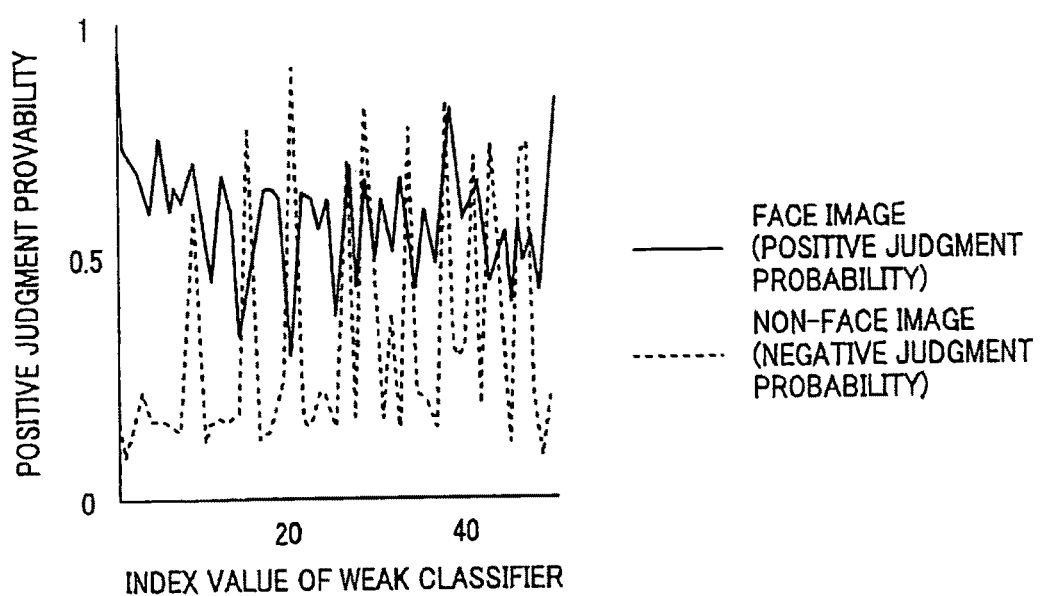
FIG. 3 is a graph showing, as an example of information stored in a judgment probability table of a weak classifier information database illustrated in FIG. 2, positive judgment probabilities for a face class and negative probabilities for a non-face class according to the first embodiment.

FIG. 3 schematically illustrates a graph showing, as an example of the information stored in the judgment probability table, the positive judgment probabilities for the face class and the negative probabilities for the non-face class. The horizontal axis of the graph is the index values of 1, 2, ..., 50 assigned to 50 weak classifiers. For each of the index values of the 50 weak classifiers, the positive judgment probabilities for the face class and the negative probabilities for the non-face class are plotted along the vertical axis.

For each class, data expressing each of the weak classifiers are stored in the weak classifier information database 21 in association with their corresponding weights $w_n$, and their index values. For each class, the corresponding weights $w_n$ of the weak classifiers are normalized to 1. That is, for each class, the corresponding weights $w_n$ of the weak classifiers meet the following equation [4]:

$$\sum_{n=1}^{Nf} w_n = 1 \qquad [4]$$

The judgment score generating section 20 further includes a classifier selection and application section 22 and an acquisition score calculation section 23.

The classifier selection and application section 22 is operative to successively select, from the weak classifier information database 21, weak classifiers to be applied in sequence to an object image. The classifier selection and application section 22 is also operative to apply the successively selected weak classifiers to the object image to thereby output $f_n$ such as 0 or 1, as a result of each application, where "n" indicates the selected order of the weak classifier for the same object image so that the output $f_n$ is obtained by applying the n-th selected weak classifier to the object image.

Note that, in this embodiment, the weak classifiers with respective index values 1, 2, ..., Nf are successively selected in the order of the index values of 1, 2, ..., Nf.

The acquisition score calculation section 23 is operative to calculate, based on the outputs $f_1, f_2, \ldots, f_n$ supplied from the classifier selection and application section 22, an acquisition score $S^{(-)}_{1:n}$.

That is, when the n-th selected weak classifier has been applied to a currently extracted sub-image (object image), the acquisition score $S^{(-)}_{1:n}$ to be calculated by the acquisition score calculation section 23 means the summation of the outputs $f_m$ (m=1, 2, ..., n) of the already applied weak classifiers for a currently extracted sub-image (object image); these already applied weak classifiers have been respectively weighted by the corresponding weights $w_m$. That is, the acquisition score $S^{(-)}_{1:n}$ can be expressed by the following equation [5]

$$S^{-}_{1:n} = \sum_{m=1}^{n} w_m f_m \quad [5]$$

In addition, the judgment score generating section 20 includes a class probability calculation section 24, a predicted distribution calculation section 25, and a continuation control section 26.

The class probability calculation section 24 is operative to calculate the posterior probability of a currently extracted object image belonging to each class given that the classified results of the already applied weak classifiers are obtained; the classified results of the already applied weak classifiers are expressed as "$f_{1:n}(=f_1, f_2, f_n)$". The posterior probability will be referred to as "class probability $p(c|f_{1:n})$" hereinafter.

The predicted distribution calculation section 25 is operative to calculate parameters representing a predicted distribution of the acquisition score that would be obtained if the pending weak classifiers, which have not yet been applied to the object image, were applied to the object image. In this embodiment, these parameters are an expectation value En and a variance Vn of the predicted distribution.

The continuation control section 26 is operative to determine, based on the acquisition score $S^{(-)}_{1:n}$, the expectation value En and the variance Vn of the predicted distribution, whether to continue the processing of the object image (currently extracted sub-image), and control the operation of the sub-image extraction section 10 and the classifier selection and application section 22 based on the determined result. The continuation control section 26 is also operative to output a judgment score S(x) of the object image x.

In this embodiment, the class probability calculation section 24 calculates the class probability $p(c|f_{1:n})$ in accordance with the following equation [6] representing the Bayes theorem:

$$p(c|f_{1:n}) = \frac{p(c)p(f_{1:n}|c)}{\sum_{c \in C} p(c)p(f_{1:n}|c)} = k_n L_n p(c|f_{1:n-1}) \quad [6]$$

where p(c) is the prior probability of the object image belonging to each class, $p(c|f_{1:n})$ represents a likelihood for the object image belonging to each class given that the classified results of the already applied weak classifiers are obtained, $L_n$ represents the judgment probabilities set forth above expressed by the following equation [7], and $k_n$ represents a normalization factor expressed by the following equation [8]:

$$L_n = p(f_n|c) \quad [7]$$

$$k_n = \begin{cases} \dfrac{\alpha_0 p(f_{1:n-1}|c=1) + \beta_0 p(f_{1:n-1}|c=0)}{\alpha_0 p(f_{1:n}|c=1) + \beta_0 p(f_{1:n}|c=0)} : n \geq 2 \\ \dfrac{\alpha_0 + \beta_0}{\alpha_0 p(f_1|c=1) + \beta_0 p(f_1|c=0)} : n = 1 \end{cases} \quad [8]$$

The probabilities included in the equation [8] can be simply calculated by the judgment probabilities $p(f_n|c)$.

Specifically, multiplying the previous class probability $p(c|f_{1:n-1})$ by the judgment probabilities $p(f_n|c)$ and normalizing the result of the multiplication with respect to the classes achieves the current class probability $p(c|f_{1:n})$. Note that how to derive the equation [6] and the parameters $\alpha_0$ and $\beta_0$ appearing in the equation [8] will be described later.

The predicted distribution calculation section 25 calculates, in accordance with the following equations [9] and [10], the expectation value $En[S_{n+1:Nf}|f_{1:n}]$ and the variance $Vn[S_{n+1:Nf}|f_{1:n}]$ of the predicted distribution that would be obtained if the pending (unapplied) weak classifiers, which have not yet been applied to the object image, were applied to the object image:

$$E_n[S_{n+1:Nf}|f_{1:n}] = \sum_{m=n+1}^{Nf} E_n[S_m|f_{1:n}] = S^{(+)}_{n+1:Nf} \quad [9]$$

$$V_n[S_{n+1:Nf}|f_{1:n}] = \sum_{m=n+1}^{Nf} V_n[S_m|f_{1:n}] \quad [10]$$

where $E_n[S_m|f_{1:n}]$ in the equation [9] and $V_n[S_m|F_{1:n}]$ in the equation [10] represent the expectation value and variance of the predicted distribution of each of the unapplied weak classifiers, respectively; they can be calculated in accordance with the following equations [11] and [12]:

$$E_n[S_m|f_{1:n}] = \int S_m p(S_m|f_{1:n}) dS_m \quad [11]$$

$$= w_m \sum_{c \in C} \frac{\alpha_{cm} p(c|f_{1:n})}{\alpha_{cm} + \beta_{cm}}$$

-continued $$V_n[S_m \mid f_{1:n}] = \int (S_m - E_n[S_m \mid F_{1:n}])^2 p(S_m \mid f_{1:n}) dS_m \qquad [12]$$

$$= w_m^2 \left(1 - \sum_{c \in C} \frac{\alpha_{cm} p(c \mid f_{1:n})}{\alpha_{cm} + \beta_{cm}}\right)^2 \sum_{c \in C} \frac{\alpha_{cm} p(c \mid f_{1:n})}{\alpha_{cm} + \beta_{cm}}$$

Specifically, in the equation [11], $p(S_m|f_{1:n})$ represents a probability distribution function, and $S_m$ represents a random variable within the range from 0 to 1. The equation [12] can be derived from the equation [11].

Note that the equations (11) and (12) can be derived from the following equations (13) representing the distribution of the score $S_m(=w_m f_m)$ of an unapplied weak classifier identified by the index value m:

$$p(S_m \mid f_{1:n}) = \sum_{f_m \in (0,1)} p(S_m \mid f_m) \sum_{c \in C} p(f_m \mid c) p(c \mid f_{1:n}) \qquad [13]$$

$$= \delta_{S_m}(w_m) \sum_{c \in C} \frac{\alpha_{cm} p(c \mid f_{1:n})}{\alpha_{cm} + \beta_{cm}}$$

where: $\delta_x(t) = \begin{cases} \infty & x = t \\ 0 & \text{otherwise} \end{cases}$, and $\alpha_{cm}$ and $\beta_{cm}$ are parameters of a beta distribution used to model the outputs $f_{1:Nf}$ of the plurality of weak classifiers; these parameters $\alpha_{cm}$, and $\beta_{cm}$ will be fully described later.

Note that $\delta_x(t)$ represents a Dirac delta function having the value zero everywhere except at x=t where its value is infinitely large in such a way that its total integral is 1. Because the Dirac delta function $\delta_x(t)$ has the characteristic that its total integral is 1, it can be used to convert continuous random variables into discrete random variables.

Specifically, the score $S_m(=w_m f_m)$ is a continuous random variable indicative of its value, and therefore, each weak classifier actually has a corresponding weight $w_m$. For this reason, in the second equation [13], using the Dirac delta function $\delta_x(t)$ allows the score $S_m$ to have a probability at only its corresponding weight $w_m$.

How to derive the right in the first equation [13] will be described hereinafter. Specifically, the addition theorem can express the $p(S_m|f_{1:n})$ as the following equation:

$$p(S_m \mid f_{1:n}) = \sum_{f_m \in (0,1)} p(S_m, f_m \mid f_{1:n}) \qquad [13A1]$$

The multiplication theorem can express the $p(S_m, f_m|f_{1:n})$ as the following equation:

$$p(S_m, f_m|f_{1:n}) = p(S_m|f_m) p(f_m|f_{1:n}) \qquad [13A2]$$

The addition theorem can express the $p(f_m|f_{1:n})$ as the following equation:

$$p(f_m \mid f_{1:n}) = \sum_{c \in C} p(f_m, c \mid f_{1:n}) \qquad [13A3]$$

Substitution of the equation [13A3] into the equation [13A2] and substitution of the equation [13A2] with the equation [13A3] into the equation [13A1] allow the upper side of the equation [13] to be derived.

When there are no sub-images to be newly clipped out by the sub-image extraction section 10 in the currently acquired image, in other words, all of the sub-images have been already subjected to the judgment-score obtaining process, the continuation control section 26 controls the score memory section 30 and the face position judgment section 40 to cause the face position judgment section 40 to carry out the detection of the face position within the currently acquired image.

In addition, the continuation control section 26 uses the expectation value $E_n[S_{n+1:Nf}|f_{1:n}]$ of the prediction distribution as a predicted score $S_{n+1:Nf}^{(+)}$ (see the equation [9]), and calculates the sum of the acquisition score $S^{(-)}_{1:n}$ calculated by the following equation [14] and the predicted score $S_{n+1:Nf}^{(+)}$ as a predicted final score $S_{1:Nf}$. Then, the continuation control section 26 calculates a dispersion range from an upper limit SH to a lower limit SL in accordance with the following equations [15] and [16]:

$$S_{1:Nf} = S_{1:n}^{(-)} + S_{n+1:Nf}^{(+)} \qquad [14]$$

$$SH = S_{1:n}^{(-)} + S_{n+1:Nf}^{(+)} + F_s \sqrt{V_n[S_{n+1:Nf}|f_{1:n}]} \qquad [15]$$

$$SL = S_{1:n}^{(-)} + S_{n+1:Nf}^{(+)} - F_s \sqrt{V_n[S_{n+1:Nf}|f_{1:n}]} \qquad [16]$$

where $F_s$ represents a factor of safety, and it can be expressed by the following equation [17]:

$$F_s(n) = b + a \exp\left(-\frac{n^2}{2\sigma^2}\right) \qquad [17]$$

where a is a penalty factor determined to increase the factor $F_s$ of safety so as to increase the dispersion range when the number n of applied weak classifiers is small, b is an integer equal to or greater than 1 that determines the magnitude of the factor $F_s$ of safety, and $\sigma$ represents a factor indicative of the degree of decrease in the factor $F_s$ of safety with increase in the number of applied weak classifiers. These values a, b, and $\sigma$ can be determined by tests, simulations, or the like. $\sqrt{V_n}$ represents the standard deviation of the predicted distribution, in other words, the square root of the variance $V_n$.

Either the determination of the penalty factor a or the setting of b to be equal to or greater than 1 maintains the reliability of determining whether to terminate the process to the current object image at a high level.

The continuation control section 26 also compares at least one of the upper limit SH and the lower limit SL of the dispersion range with a previously set threshold TH, such as 0.5 in this embodiment. Specifically, the threshold TH can be normally determined to, for example, the half of the maximum acquisition score (the acquisition score when all of the plurality of weak classifiers are sensitive to the object image) in order to determine whether the object image is a face image based on majority rule of the judgment results of the plurality of weak classifiers.

The continuation control section 26 further determines that the predicted final score $S_{1:Nf}$ sufficiently reliable when the upper limit SH is less than the threshold TH or the lower limit SL is greater than the threshold TH to thereby abort the process to the current object image. Then, the continuation control section 26 stores the predicted final score $S_{1:Nf}$ at that time in the judgment score memory section 30 as the judgment score S(x), controls the sub-image extraction section 10 to extract a new sub-image as a new object image, and controls the sections of the judgment score generating section 20 to thereby carry out the judgment-score obtaining process with respect to the new object image.

On the other hand, the continuation control section 26 determines that the predicted final score $S_{1:Nf}$ is not sufficiently reliable when the upper limit SH is equal to or greater than the threshold TH and the lower limit SL is equal to or less than the threshold TH to thereby continue the process to the current object image, that is, repeatedly select the next weak classifier and apply the selected weak classifier to the object image).

When the application of all of the weak classifiers to the current object image is completed without being terminated, the continuation control section 26 outputs the acquisition score $S^{(-)}_{1:Nf}$ as the judgment score $S(x)$.

Derivation Process of Class Probability

As seen by the equation [6] representing the Bayes theorem, the class probability $p(c|f_{1:Nf})$ as the posterior probability of the object image belonging to each class can be calculated based on the likelihood $p(f_{1:Nf}|c)$ for the object image belonging to each class given that the classified results of the already applied weak classifiers are obtained, and the prior probability $p(c)$ of the object image belonging to each class given that the classified results of the already applied weak classifiers are obtained.

Because the classified results $f_{1:Nf}=(f_1, f_2, \ldots, f_{Nf})$ five are discrete variables each taking on 0 or 1, it is assumed that the classified results $f_{1:Nf}$ are stochastically generated in accordance with a Bernoulli distribution with parameters $\mu_c=(\mu_{c1}, \ldots, \mu_{c2}, \ldots, \mu_{cNf})$. Assuming that the individual weak classifiers are mutually independent, the following equation [18] is established:

$$p(f_{1:Nf} | u_c) = Beru(f_{1:Nf} | \mu_c) = \prod_{n=1}^{N_f} \mu_{cn}^{f_n} (1 - \mu_{cn})^{1-f_n} \quad [18]$$

Assuming that each of the parameters $\mu_c$ is a continuous variable taking on a value from 0 to 1, and is generated based on a beta distribution with parameters $\alpha_c$, $\beta_c$, which is a conjugate prior of the Bernoulli distribution, the following equation [19] is derived:

$$p(\mu_c | c) = Beta(\mu_c | \alpha_c, \beta_c) \quad [19]$$

$$= \sum_{n=1}^{N_f} \frac{\Gamma(\alpha_{cn} + \beta_{cn})}{\Gamma(\alpha_{cn})\Gamma(\beta_{cn})} \mu_{cn}^{\alpha_{cn}-1}(1-\mu_{cn})^{\beta_{cn}-1}$$

where $\Gamma(x)$ is a gamma function defined by the following equation [20]:

$$\Gamma(x) = \int_0^\infty \mu^{x-1} e^{-u} d\mu \quad [20]$$

Marginalize (integrate out) the parameters $u_c$ from the equation [19] allows the likelihood $p(f_{1:Nf}|c)$ for each class to be expressed by the following equation [21]:

$$p(f_{1:Nf} | c) = \int p(f_{1:Nf} | \mu_c) p(\mu_c | c) d\mu_c \quad [21]$$

$$= \prod_{n=1}^{N_f} \frac{f_n \alpha_{cn} + (1 - f_n)\beta_{cn}}{\alpha_{cn} + \beta_{cn}}$$

where $\Gamma(x+1) = x\Gamma(x)$ if a positive real number x is greater than 0

Similarly, assuming that the class elements c are stochastically generated in accordance with a Bernoulli distribution with a parameter $u_0$, the following equation [22] is derived. In addition, assuming that the parameter $u_0$ is generated based on a beta distribution with parameters $\alpha_0$, $\beta_0$, the following equation [23] is derived:

$$p(c | \mu_0) = Beru(c | \mu_0) = \mu_0^c (1 - \mu_0)^{1-c} \quad [22]$$

$$p(\mu_0) = Beta(\mu_0 | \alpha_0, \beta_0) = \frac{\Gamma(\alpha_0 + \beta_0)}{\Gamma(\alpha_0)\Gamma(\beta_0)} \mu_0^{\alpha_0-1}(1-\mu_0)^{\beta_0-1} \quad [23]$$

Marginalize (integrate out) the parameters $u_0$ from the equation [23] allows the prior probability $p(c)$ for each class to be expressed by the following equation [24]:

$$p(c) = \int p(c | \mu_0) p(\mu_0) d\mu_0 = \frac{c\alpha_0 + (1-c)\beta_0}{\alpha_0 + \beta_0} \quad [24]$$

where $\alpha_0$ and $\beta_0$ are set to 1 with no knowledge of $\mu_0$

Thus, using the equations [21] and [24] and the Bayes theorem allows the class probability $p(c|f_{1:Nf})$ for each class to be obtained in accordance with the following equation [25]:

$$p(c | f_{1:Nf}) = \frac{p(c) p(f_{1:Nf} | c)}{\sum_{c \in C} p(c) p(f_{1:Nf} | c)} \quad [25]$$

$$= \frac{\{c\alpha_0 + (1-c)\beta_0\} p(f_{1:Nc} | c)}{\alpha_0 p(f_{1:Nf} | c = 1) + \beta_0 p(f_{1:Nf} | c = 0)}$$

Note that the equation [25] represents the class probability when all of the Nf weak classifiers are applied to the object image. The equation [6] is derived by amending the equation [25] such that the class probability $p(c|f_{1:n})$ is updated based on the previous calculated result $p(c|f_{1:n-1})$ each time a weak classifier is applied to the object image.

Operations

The overall processing flow of the face position detection section 5 will be described with reference to the flowchart of FIG. 4.

When an acquired image is supplied to the face position detection section 5 from the image acquisition section 3, the sub-image extraction section 10 initializes the size and position of the scanning window (extraction window) in step S110. The size and position will thereafter each be changed in a predetermined sequence. The size of the scanning window is then selected in step S120, and in step S130, the position for the scanning window is selected, and thereafter, a new sub-image having the size and position corresponding to the size of the selected scanning window is extracted from the acquired image in step S130.

In this embodiment, in the first execution of step S120 following step S110, the smallest size of scanning window is selected. Thereafter, in successive executions of step S120, successively larger sizes of scanning windows are selected. In the first execution of step S130 following step S120, the scanning window is set to the upper leftmost position in the acquired image, to extract a sub-image that located at that position. Thereafter, in successive executions of step S130, the scanning window is successively scanned from left to right (main scanning direction) and top to bottom (secondary scanning direction) of the acquired image, to extract successive sub-images.

In step S140, the judgment score generating section 20 generates the judgment score S(x), and stores the judgment score S(x) in the judgment score memory section 30 in association with the corresponding object image x.

When the judgment score S(x) is generated so that the process to the currently extracted sub-image (object image) is completed, the sub-image extraction section 10 judges whether the scanning window has completed successive shifting from the upper left corner to the lower right corner of the acquired image in step S150. If that has not yet been completed, operation proceeds to step S130 to extract a new sub-image, and the processing of steps S130 to S140 is repeated for the sub image extracted in step S130.

If it is judged in step S150 that the successive shifting of the scanning window has been completed, it is determined that the processing using the currently set size of scanning window has been completed. Then, the sub-image extraction section 10 judges whether scanning of the acquired image has been completed for all of the scanning window sizes in step S160. If any size has not yet been selected, operation returns to step S120, and steps S120 to S150 are repeated with a new size of scanning window being selected in step S120.

If it is found in step S160 that processing of the object image using all of the scanning window sizes has been completed, then since this signifies that all requisite processing of the acquired image has been completed, the face position judgment section 40 performs face position judgment. Specifically, the face position judgment section 40 judges the judgment scores S(x) stored in the judgment score memory section 30, to determine the sub-image associated with the highest judgment score S(x). The face position is then judged to be the position of the sub-image within the acquired image in step S170. The processing then ends.

Next, the operation to be executed by the judgment score generating section 20 in step S140 will be fully described with reference to the flowchart of FIG. 5. For the purpose of simply descriptions, the index value (x) will be omitted from various reference characters used to describe the operation hereinafter. For example, the output $f_n(x)$ of a weak classifier will be referred to as $f_n$.

When a currently extracted sub-image (object image) is supplied to the classifier selection and application section 22, the acquisition score calculation section 23 clears a previously calculated and stored acquisition score $S^{(-)}_{1:n}$ to zero to initialize it in step S210. Similarly, in step S210, the class probability calculation section 24 overwrites a calculated and stored a class probability $p(c|f_{1:n})$ with a value of "1/Y" to thereby initialize it; Y represents the number of classes in step S210.

Next, the classifier selection and application section 22 selects a weak classifier in the plurality of weak classifiers, and applies the selected weak classifier to the object image to thereby obtain the output $f_n$ of the selected weak classifier as a result of the application (classification) in step S220. Note that n represents the selected order of the weak classifier for the same object image so that the output $f_n$ is obtained by applying the n-th selected weak classifier to the object image.

Then, the acquisition score calculation section 23 multiplies the output $f_n$ of the selected weak classifier by a corresponding weight $w_n$ to thereby calculate a value $w_n f_n$, and adds the value $w_n f_n$ to the preciously calculated and stored acquisition score $S^{(-)}_{1:n-1}$, thus updating the preciously calculated and stored acquisition score $S^{(-)}_{1:n-1}$, to an acquisition score $S^{(-)}_{1:n}$, which is represented as "$S^{(-)}_{1:n} = S^{(-)}_{1:n-1} + w_n f_n$"; the value of the previously calculated and stored acquisition score $S^{(-)}_{1:n-1}$ has been initialized to zero when n=1 in step S230.

Thereafter, the acquisition score calculation section 23 determines whether to apply all of the weak classifiers to the current object image, that is, whether the currently selected and applied weak classifier is the Nf-th weak classifier in step S240.

Figure 4:
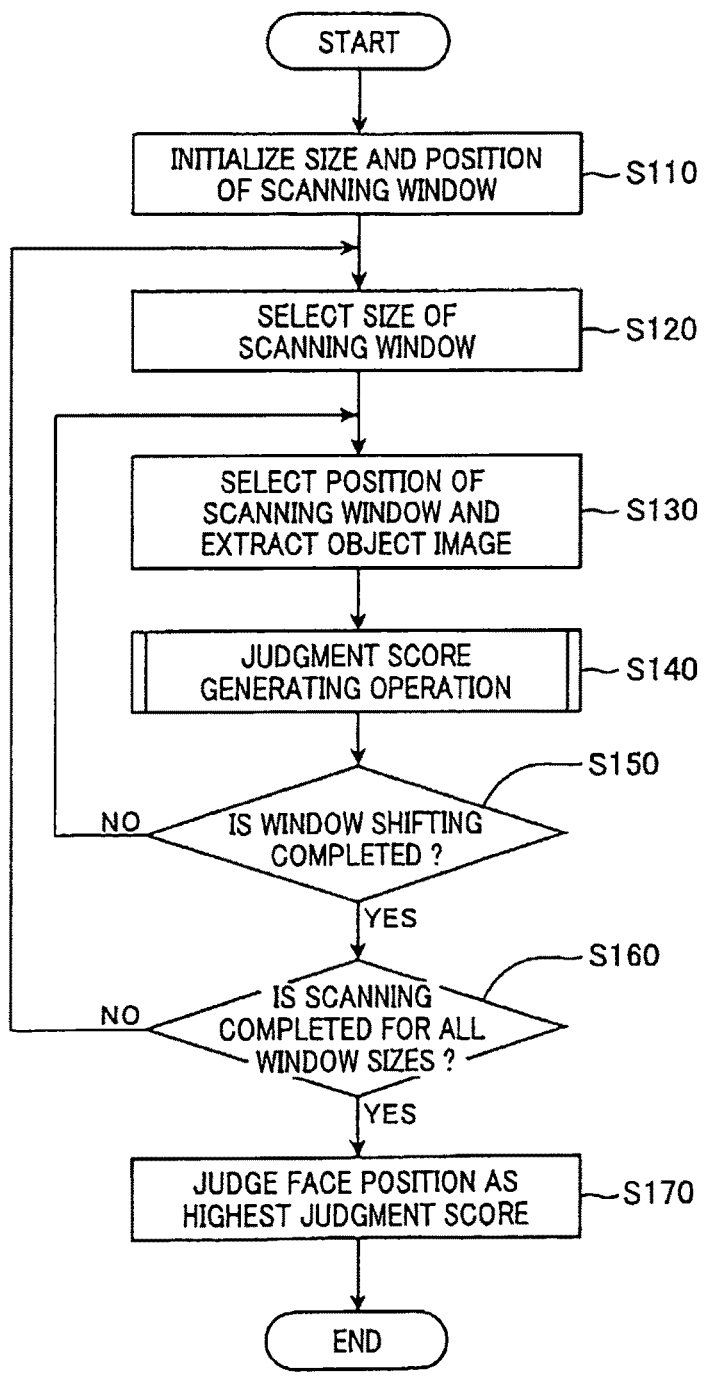
FIG. 4 is a flowchart schematically illustrating an overall processing flow of the face position detection section illustrated in FIGS. 1 and 2.

If all of the weak classifiers have been already applied to the current object image (YES in step S240), the acquisition score calculation section 23 outputs the acquisition score $S^{(-)}_{1:Nf}$ calculated in step S230 as the judgment store S to thereby store it in the judgment score memory section 30 in step S330, returning to step S150 of the main routine of FIG. 4.

Otherwise, at least one unapplied weak classifier remains in all of the weak classifiers (NO in step S240), the class probability calculation section 24 calculates the class probability $p(c|f_{1:n})$ in accordance with the equation [6], and updates a previously calculated and stored class probability $p(c|f_{1:n-1})$ to the class probability $p(c-f_{1:n})$. Note that the class probability $p(c|f_{1:n})$ is calculated to be updated for each of the face class (c=1) and the non-face class (c=0) in step S250.

After the class-probability update, the predicted distribution calculation section 25 calculates, based on the updated class probability $p(c|f_{1:n})$, the parameters (expectation value $En[S_{n+1:Nf}|f_{1:n}]$ and the variance $Vn[S_{n+1:Nf}|f_{1:n}]$ of the predicted distribution that would be obtained if the at least one unapplied weak classifier, which has not yet been applied to the object image, were applied to the object image in accordance with the equations [9] and [10] in step S260.

Then, the continuation control section 26 calculates the predicted final score $S_{1:Nf}$ by adding the expectation value $En[S_{n+1:Nf}|f_{1:n}]$ of the prediction distribution calculated in step S260 as the predicted score $S_{n+1:Nf}^{(+)}$ to the acquisition score $S^{(-)}_{1:n}$ calculated in step S230 in accordance with the equation [14] in step S270.

In step S270, the continuation control section 26 also calculates the dispersion range from the upper limit SH to the lower limit SL in accordance with the equations [15] and [16], and determines whether the upper limit SH is less than the threshold TH. If the upper limit SH is equal to or greater than the threshold TH (NO in step S270), the continuation control section 26 determines whether the lower limit SL is greater than the threshold TH in step S280.

If the upper limit SH is equal to or greater than the threshold TH (NO in step S270) and the lower limit SL is equal to or less than the threshold TH (NO in step S280), the continuation control section 26 determines that the accuracy of the prediction is insufficient, then returning to step S220 and continuing the processing to the current object image in steps S220 to S280.

Otherwise, if either the upper limit SH is less than the threshold TH (YES in step S270) or the lower limit SL is greater than the threshold TH (YES in step S280), the continuation control section 26 determines that the accuracy of the prediction is sufficient. Thus, the continuation control section 26 outputs the predicted final score $S_{1:Nf}$ as the judgment score S so as to store it in the judgment score memory section 30, then returning to step S150 of the main routine of FIG. 4.

Advantages

As described above, the driver assistance system 1 according to this embodiment is configured to judge whether to continuously apply the unapplied weak classifiers to the object image or early discard the object image based on: not only the acquisition score $S^{(-)}_{1:n}$ based on the classified results of the already applied weak classifiers but also the behaviors of the unapplied weak classifiers that would be obtained if the unapplied weak classifiers, which have not yet been applied to the object image, were applied to the object image.

Specifically, the judgment is carried out by obtaining, as the behaviors, the predicted-distribution parameters (the expectation value $En[S_{n+1:Nf}|f_{1:n}]$ and the variance $Vn[S_{n+1:Nf}|f_{1:n}]$ of the acquisition score of the unapplied weak classifiers that would be obtained if the unapplied weak classifiers were applied to the object image.

With the configuration of the driver assistance system 1, it is possible to necessarily use the information of the unapplied weak classifiers to thereby determine whether to early discard the object image. Thus, the configuration reduces time taken to recognize the face position without reducing the robustness of the recognition, thus implementing drier-assistance control with high reliability.

Note that, in this embodiment, the plurality of weak classifiers stored in the weak classifier information database 21 serves as a classifying unit, the classifier selection and application section 22 serves as an applying unit, and the acquisition score calculation section 23 serves as a score calculating unit. In addition, the predicted distribution calculation section 25 serves as a distribution calculating unit, the continuation control section 26 serves as an early judging unit, the weak classifier information database 21 serves as a storage unit, and the class probability calculation section 24 serves as a probability calculating unit.

Second Embodiment

A vehicle-installed driver assistance system to which an image recognition apparatus according to the second embodiment of the present invention is applied will be described hereinafter.

The structure of the driver assistance system according to the second embodiment is substantially identical to that of the driver assistance system 1 according to the first embodiment except for the following different points. So, like parts and system sections between the driver assistance systems according to the first and second embodiments, to which like reference characters are assigned, are omitted or simplified in description.

In the second embodiment, the operation to be executed by the classifier selection and application section 22 in step S220, and part of the operation to be executed by the predicted distribution calculation section 25 are different from the corresponding operations according to the first embodiment.

Figure 5:
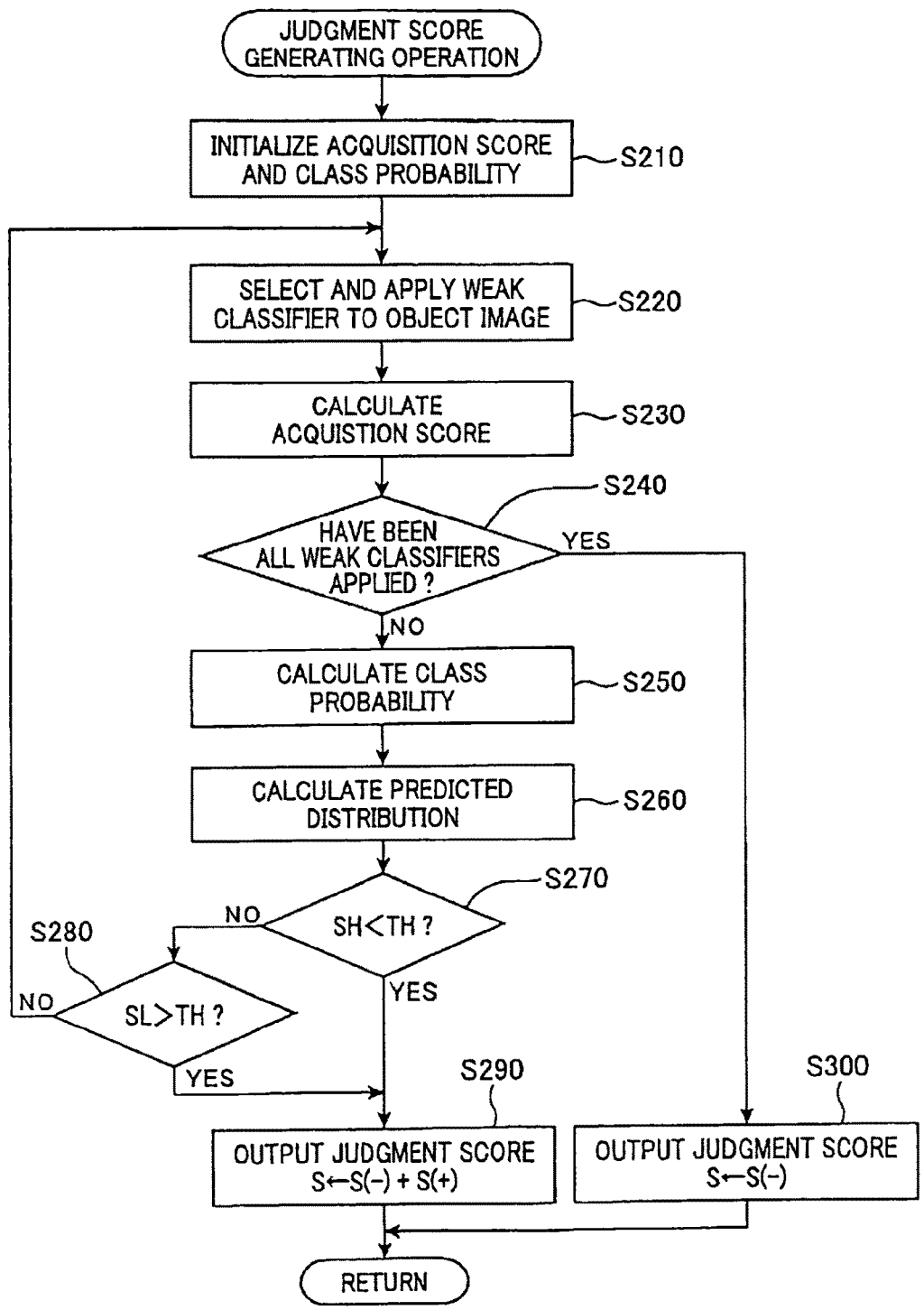
FIG. 5 is a flowchart schematically illustrating an operation in step S140 of FIG. 4 to be executed by a judgment score generating section illustrated in FIG. 2.

Referring to FIG. 5, the predicted distribution calculation section 25 calculates, based on the updated class probability $p(c|f_{1:n})$, the parameters (expectation value $En[S_{n+1:Nf}|f_{1:n}]$ and the variance $Vn[S_{n+1:Nf}|f_{1:n}]$ of the predicted distribution that would be obtained if the at least one unapplied weak classifier, which has not yet been applied to the object image, were applied to the object image in accordance with the equations [9] and [10] in step S260a.

Then, the predicted distribution calculation section 25 stores therein information, such as the index value, of the weak classifier having the highest variance $Vn[S_m|f_{1:n}]$ in step S260a.

In step S220a, the classifier selection and application section 22 selects the weak classifier in the plurality of weak classifiers; this selected weak classifier corresponds to the information obtained in the previous processing cycle to the object image and stored in the predicted distribution calculation section 25. Note that, in the first processing cycle to the object image, the classifier selection and application section 22 can select a previously determined weak classifier, such as a weak classifier with the heaviest weight, or the like, or can randomly select a weak classifier.

Advantages

With the driver assistance system according to the second embodiment, it is possible to immediately reduce the variance $Vn[S_{n+1:Nf}|f_{1:n}]$ of the predicted distribution, thus carrying out the early judgment more earlier than that according to the first embodiment. This results in further reducing time taken to recognize the face position in the acquired image.

Tests

Tests to confirm the effectiveness of the image-recognition means (methods) according to the first and second embodiments were carried out.

Figure 6:
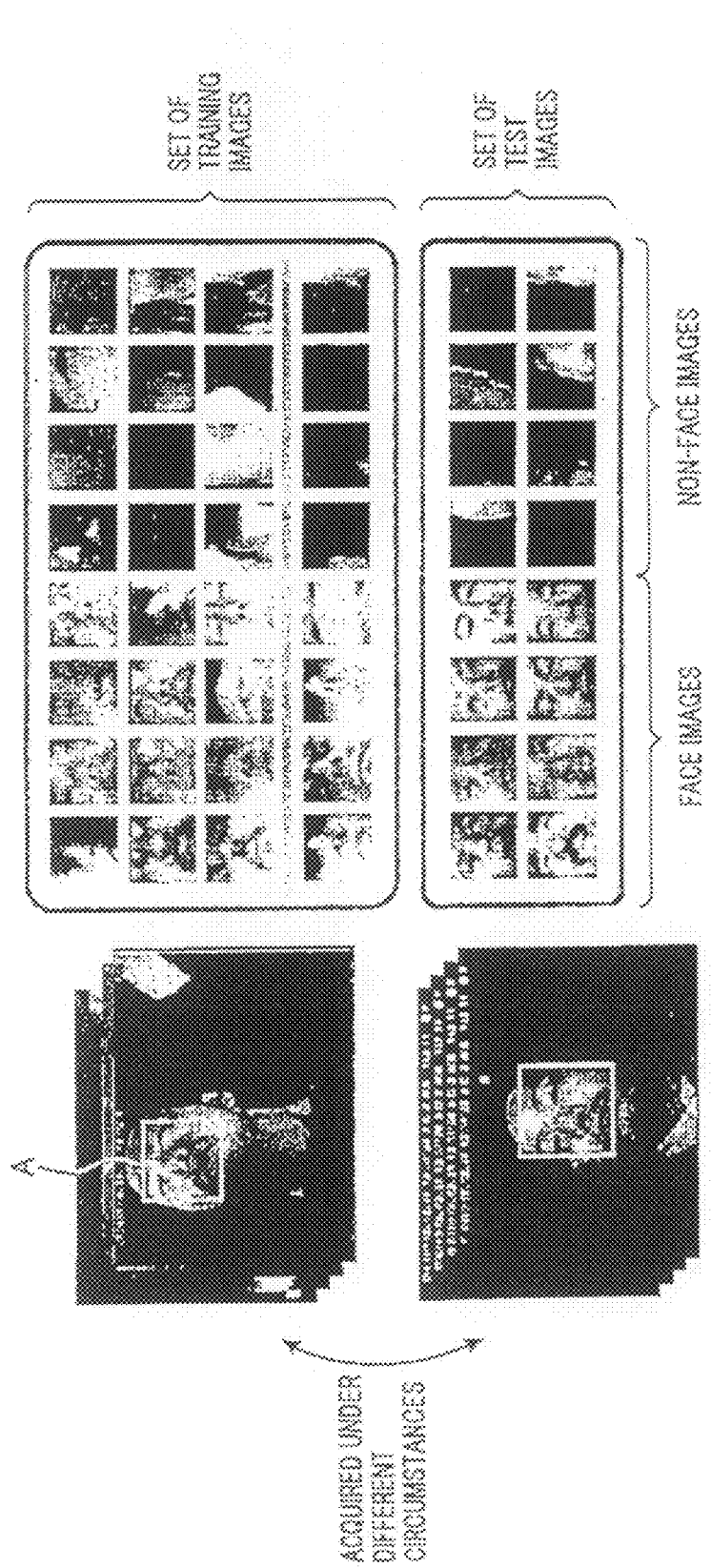
FIG. 6 is a view schematically illustrating a set of many training images to be used for tests and a set of many test images to be used therefor according to each of the first and second embodiments.

FIG. 6 schematically illustrates a set of many training images to be used for the tests and a set of many test images to be used therefor.

A set of many images were captured in a target vehicle. In each of the captured images, a proper facial region was manually set. Thereafter, the facial region was randomly shifted in position and/or in size so that a set of many face images was generated for training a plurality of weak classifiers. In addition, a set of many images each of which includes a part of the proper facial region in each of the captured images and does not include the proper facial region was generated as a set of many non-face images for training the plurality of weak classifiers.

Under actual conditions, it may be substantially impossible to prepare a set of many training images that include all various luminous environments to be expected and all various driver's faces to be expected. For this reason, each of the image-recognition methods according to the first and second embodiments must identify face images included in many images acquired under different circumstances. In order to check that each of the image-recognition methods according to the first and second embodiments has higher versatility and robustness, a large number of images of drivers in a vehicle were acquired under various environments, such as different image acquisition devices, different operators as the drivers, and different luminous environments. In the large number of acquired images, many face images and many non-face images were generated, and these face images and non-face images were used as a set of test images.

The first image-recognition method disclosed in the first embodiment, referred to as "ClassProb method", and the second image-recognition method disclosed in the second embodiment, referred to as "AS Boost", were carried out using 1000 weak classifiers for recognition of the face images in the test images.

In addition, the third image-recognition method as a first comparison example, referred to as "Normal Boost", was carried out using the 1000 weak classifiers for recognition of the face images in the test images without performing early judgment therefor. The fourth image-recognition method as a second comparison example, referred to as "Viola&Jones" and disclosed in reference 1, was carried out using the 1000 weak classifiers for recognition of the face images in the test images.

Note that the 1000 weak classifiers (Nf=1000) were trained using the AdaBoost algorithm and the set of training images, and each of the 1000 weak classifiers carried out classifications of the set of test images based on the Haar-like features like each of the first and second embodiments.

In the first and second image-recognition methods disclosed in the first and second embodiments, the parameters a, b, and σ that determine the factor $F_s$ of safety expressed in the equation [17] are set to 9, 3, and Nf/6.25, respectively. Because the parameter σ is determined depending on the number Nf of the plurality of weak classifiers, the behavior of the factor Fs of safety is identical regardless of the number Nf of the plurality of weak classifiers.

Figure 7A:
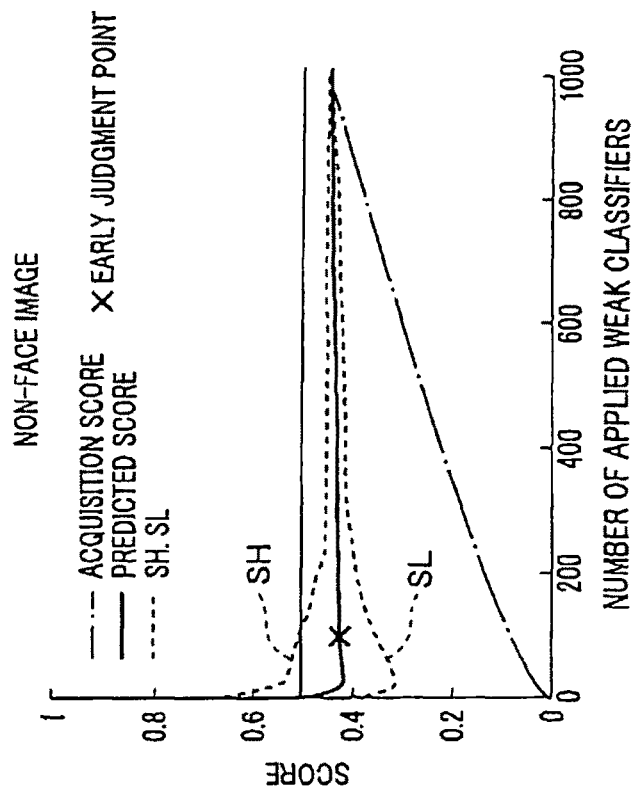
FIG. 7A is a graph schematically illustrating the behavior of each of an acquisition score acquisition score, a predicted score, an upper limit of a distribution range, and a lower limit thereof along the number (n) of applied weak classifiers according to each of the first and second embodiments; these items of data were calculated when all of Nf weak classifiers were applied to a face image contained in the face class as an object image.

FIG. 7A schematically illustrates the behavior of each of the acquisition score acquisition score $S^{(-)}_{1:n}$, the predicted score $S^{(+)}_{n+1:Nf}$, the upper limit SH of the distribution range, and the lower limit SL thereof along the number (n) of applied weak classifiers; these items of data $S^{(-)}_{1:n}$, $S^{(+)}_{n+1:Nf}$, SH, and SL were calculated when all of the Nf weak classifiers were applied to a face image contained in the face class as an object image.

Figure 7B:
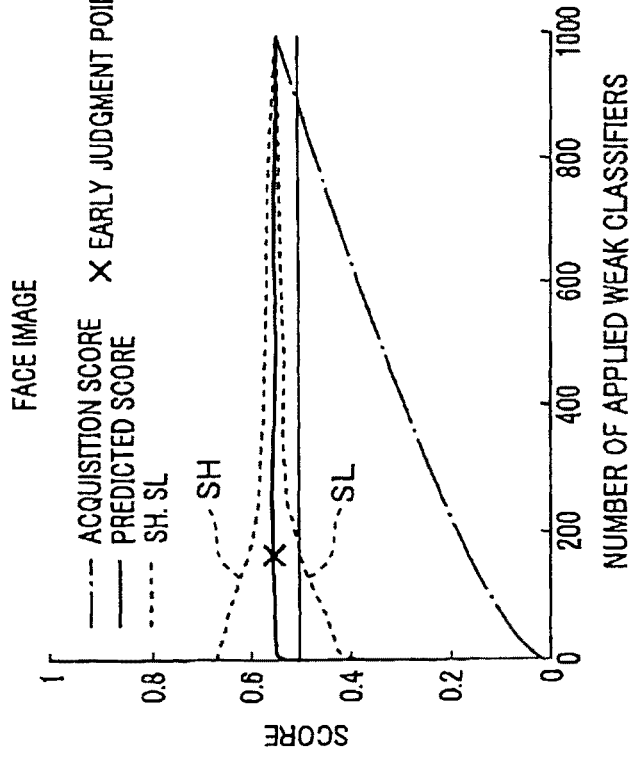
FIG. 7B is a graph schematically illustrating the behavior of each of the acquisition score acquisition score, the predicted score, the upper limit of the distribution range, and the lower limit thereof along the number (n) of applied weak classifiers; these items of data were calculated when all of the Nf weak classifiers were applied to a non-face image contained in the non-face class as an object image.

Similarly, FIG. 7B schematically illustrates the behavior of each of the acquisition score acquisition score $S^{(-)}_{1:n}$, the predicted score $S^{(+)}_{n+1:Nf}$, the upper limit SH of the distribution range, and the lower limit SL thereof along the number (n) of applied weak classifiers; these items of data $S^{(-)}_{1:n}$, $S^{(+)}_{n+1:Nf}$, SH, and SL were calculated when all of the Nf weak classifiers were applied to a non-face image contained in the non-face class as an object image.

Tests of recognition for the test images using each of the methods ("ClassProb", "AS Boost", "Normal Boost", "Viola&Jones") were carried out. The results of the tests obtained, for each of the methods ("ClassProb", "AS Boost", "Normal Boost", "Viola&Jones"), the probability (false positive rate) that non-face images are detected incorrectly as face images, the probability (miss rate) that face images are missed to be detected as non-face images, and an average number of applied weak classifiers before judgment.

Figures 8A, 8B:
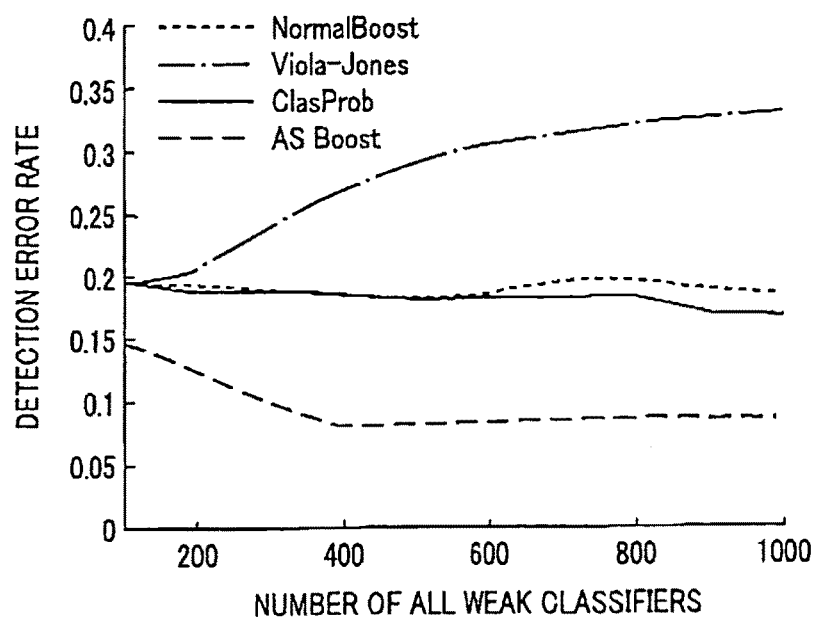
FIG. 8A is a table schematically illustrating, for each of methods ("ClassProb", "AS Boost", "Normal Boost", "Viola&Jones"), a false positive rate, miss rate, and an average number of applied weak classifiers before judgment.
FIG. 8B is a graph schematically illustrating, for each of the methods ("ClassProb", "AS Boost", "Normal Boost", "Viola&Jones"), a detection error rate as the sum of the false positive rate and the miss rate when the number (Nf) of a plurality of weak classifiers is changed.

FIG. 8A schematically illustrates, for each of the methods ("ClassProb", "AS Boost", "Normal Boost", "Viola&Jones"), the false positive rate, miss rate, and the average number of applied weak classifiers before judgment.

FIG. 8B schematically illustrates, for each of the methods ("ClassProb", "AS Boost", "Normal Boost", "Viola&Jones"), the detection error rate as the sum of the false positive rate and the miss rate when the number (Nf) of the plurality of weak classifiers is changed.

FIGS. 7A and 7B demonstrate that each of the first and second image-recognition methods ("ClassProb method" and "AS Boost") can predict the final judgment score at a considerably early stage at the number of applied weak classifiers of 50 or thereabout, and increase the reliability of the predicted score, in other words, reduce the variance of the predicted distribution, with increase in the number of applied weak classifiers. Thus, each of the first and second image-recognition methods ("ClassProb method" and "AS Boost") allows early judgment to be carried out at the point illustrated as the mark of "×" that is less than 200 of applied weak classifiers.

FIG. 8A demonstrates that each of the first and second image-recognition methods ("ClassProb method" and "AS Boost"):

reduces the detection error rate to be similar to or less than that of the first comparison example (Normal Boost), reduces the number of applied weak classifiers as compared with that of the second comparison example (Viola&Jones) so that the judgment timing thereof is earlier than that of the second comparison example (Viola&Jones), and reduces the detection error rate to be less than that of the second comparison example (Viola&Jones).

Particularly, the second image-recognition method ("AS Boost") reduces the number of applied weak classifiers to be substantially the half of that of the second comparison example (Viola&Jones).

In addition, FIG. 8B demonstrates that the result of the second comparison example (Viola&Jones) has a tendency that the corresponding detection error rate increases with increase in the number of all of weak classifiers. In contrast, the performance of each of the first and second image-recognition methods ("ClassProb method" and "AS Boost") shows that the corresponding detection error rate is Similar to or less than that of the first comparison example (Normal Boost) irrespective of the number of all of weak classifiers. Moreover, the performance of each of the first and second image-recognition methods ("ClassProb method" and "AS Boost") is prevented from being reduced even if the number of all of weak classifiers increases, and maintained at a substantially constant level irrespective of the increase in the number of all of weak classifiers. Particularly, the result of the second image-recognition method ("AS Boost") shows that substantially 400 weak classifiers can draw the substantially best out of the second image-recognition method.

It follows from what has been demonstrated that, different from the second comparison example, each of the first and second image-recognition methods ("ClassProb method" and "AS Boost") achieve both early judgment and robustness at their high levels independently of the number of all of weak classifiers.

The present invention is not limited to each of the first and second embodiments, and therefore, it can be modified within the scope thereof.

In each of the first and second embodiments, the number of classes is two, but the number of classes can be set to be three or more. For example, the face class to which face images belongs can be divided into a plurality of sub-classes, for example, one of which consists of face images with glasses, another one of which consists of face images with sunglasses.

In this modification, a group of weak classifiers in a plurality of weak classifiers can be set for each of the classes including sub-classes and non-face classes. A set of the classes including sub-classes and non-face classes can be given as C, and elements of each of the sub-classes and non-face class can be expressed as c. For example, elements of the sub-classes are different values, and each element c of the non-face class is 0. Using the parameters c allows the judgment probabilities of each weak classifier $f_n$ for each element c to be expressed as a "$p(f_n|c)$"

The face position detection apparatus can be configured to estimate a corresponding class for each of selected weak classifiers based on the corresponding judgment probability, and switch weak classifiers to be applied to an object image based on the estimated class to thereby carry out image recognition of the object image. For example, specific methods of this modification have been well known in, for example, U.S. Patent Application Publications No. 2009/0304290A1 corresponding to Japanese Patent Application Publication JP 2009-295100. Because the U.S. Patent Application Publication is assigned to the same assignee as that of this application, disclosures of this Patent Publication are incorporated herein by reference.

In each of the first and second embodiments, weak classifiers are used to carry out recognition of acquired images, but trained classifiers, untrained classifiers, and strong classifiers can be used to carry out recognition of acquired images.

While there has been described what is at present considered to be these embodiments and their modifications of the present invention, it will be understood that various modifications which are not described yet may be made therein, and it is intended to cover in the appended claims all such modifications as fall within the scope of the invention.

What is claimed is:

1. An image recognition apparatus comprising:
a classifying unit comprising a plurality of classifiers, the plurality of classifiers being configured to be sensitive to images respectively having different specific patterns;
an applying unit configured to successively select specific classifiers from the plurality of classifiers, and apply the selected specific classifiers in sequence to an object image;
a score calculating unit configured to calculate, each time one of the selected specific classifiers is applied to the object image, a summation of an output of at least one classifier already applied to the object image, the output of the at least one classifier being weighed by a corresponding weight;
a distribution calculating unit configured to calculate, each time one of the selected specific classifiers is applied to the object image, a predicted distribution of an acquisition score that would be obtained if at least one unapplied classifier from the plurality of classifiers, were applied to the object image, the acquisition score being a summation of an output of the at least one unapplied classifier; and
a judging unit configured to judge, based on the predicted distribution, whether to terminate an application of the at least one unapplied classifier to the object image by the applying unit; wherein
the at least one unapplied classifier is provided in a plurality of unapplied classifiers, the distribution calculating unit is configured to calculate an individual predicted distribution for each of the plurality of unapplied classifiers, and calculate at least one of an expectation value and a variance of the predicted distribution of the acquisition score by integrating the individual predicted distributions for the plurality of unapplied classifiers, and the applying unit is configured to select one of the plurality of unapplied classifiers to be next applied to the object image, the one of the plurality of unapplied classifiers to be next applied having the highest variance in the plurality of unapplied classifiers.

2. An image recognition apparatus comprising:
a classifying unit comprising a plurality of classifiers, the plurality of classifiers being configured to be sensitive to images respectively having different specific patterns;
an applying unit configured to successively select specific classifiers from the plurality of classifiers, and apply the selected specific classifiers in sequence to an object image;
a score calculating unit configured to calculate, each time one of the selected specific classifiers is applied to the object image, a summation of an output of at least one classifier already applied to the object image, the output of the at least one classifier being weighed by a corresponding weight;
a distribution calculating unit configured to calculate, each time one of the selected specific classifiers is applied to the object image, a predicted distribution of an acquisition score that would be obtained if at least one unapplied classifier from the plurality of classifiers, were applied to the object image, the acquisition score being a summation of an output of the at least one unapplied classifier; and
a judging unit configured to judge, based on the predicted distribution, whether to terminate an application of the at least one unapplied classifier to the object image by the applying unit; wherein
the object image is inputted in a plurality of object images so that the applying unit is configured to successively select the classifiers, and apply the selected classifiers in sequence to a currently input object image in the plurality of object images, the image recognition apparatus further comprising:
a storing unit configured to store therein information, the information including, for each of a plurality of previously set classes for classifying the plurality of object images, a first judgment probability of each of the classifiers making a positive judgment on at least one of the object images belonging to a corresponding one of the plurality of previously set classes, and a second judgment probability of each of the classifiers making a positive judgment on at least one of the object images that does not belong to a corresponding one of the plurality of previously set classes; and
a probability calculating unit configured to calculate, for each of the plurality of previously set classes, a posterior probability of the currently input object image belonging to a corresponding one of the plurality of previously set classes,
the distribution calculating unit being configured to calculate the predicted distribution of the acquisition score based on the posterior probability and the information stored in the storing unit.

3. An image recognition apparatus comprising:
a classifying unit comprising a plurality of classifiers, the plurality of classifiers being configured to be sensitive to images respectively having different specific patterns;
an applying unit configured to successively select specific classifiers from the plurality of classifiers, and apply the selected specific classifiers in sequence to an object image;
a score calculating unit configured to calculate, each time one of the selected specific classifiers is applied to the object image, a summation of an output of at least one classifier already applied to the object image, the output of the at least one classifier being weighed by a corresponding weight;
a distribution calculating unit configured to calculate, each time one of the selected specific classifiers is applied to the object image, a predicted distribution of an acquisition score that would be obtained if at least one unapplied classifier from the plurality of classifiers, were applied to the object image, the acquisition score being a summation of an output of the at least one unapplied classifier; and
a judging unit configured to judge, based on the predicted distribution, whether to terminate an application of the at least one unapplied classifier to the object image by the applying unit; wherein
the judging unit comprises:
a predicted score and distribution range obtaining unit configured to obtain:
a predicted score by adding the acquisition score to an expectation value of the predicted distribution; and
a distribution range defined from an upper limit to a lower limit based on a variance of the predicted distribution; and a comparing unit configured to:
compare each of the upper limit and lower limit of the distribution range with a preset threshold; and
set the predicted score as a final acquisition score for the object image to terminate the application of the at least one unapplied classifier to the object image by the applying unit; wherein
the at least one unapplied classifier is provided in the plurality of unapplied classifiers, and the predicted score and distribution range obtaining unit is configured to:
obtain an allowable value by multiplying a standard deviation of the predicted distribution by a factor of safety so determined as to be reduced with an increase in a number of the plurality of unapplied classifiers; and
carry out at least one of an addition of the allowable value to the predicted score and a subtraction of the allowable value from the predicted score to thereby calculate the upper limit and lower limit of the distribution range defined.

4. An image recognition apparatus according to claim 3, wherein the factor of safety is normalized based on a number of the plurality of classifiers constituting the classifying unit.

* * * * *